(12) United States Patent
Fraidlin et al.

(10) Patent No.: US 6,282,109 B1
(45) Date of Patent: Aug. 28, 2001

(54) CONTROLLER FOR A NON-ISOLATED POWER FACTOR CORRECTOR AND METHOD OF REGULATING THE POWER FACTOR CORRECTOR

(76) Inventors: Simon Fraidlin, 4512 Chesterwood Dr., Plano, TX (US) 75093; Anatoliy Polikarpov, 2530 E. Meadows, Apartment M, Mesquite, TX (US) 75150

( * ) Notice: Subject to any disclaimer, the term of this patent is extended or adjusted under 35 U.S.C. 154(b) by 0 days.

(21) Appl. No.: 09/560,477

(22) Filed: Apr. 28, 2000

(51) Int. Cl.$^7$ .............................. H02M 5/42; H02M 5/447

(52) U.S. Cl. .................................. 363/89; 363/84; 363/37

(58) Field of Search .................................. 363/84, 85, 89, 363/96, 97, 16, 20, 25, 21, 44, 48, 41, 37, 40

(56) References Cited

U.S. PATENT DOCUMENTS

| | | | |
|---|---|---|---|
| 4,209,683 | * | 6/1980 | Kiuchi et al. ........................ 363/96 |
| 4,831,508 | * | 5/1989 | Hunter .................................. 363/44 |
| 5,283,726 | * | 2/1994 | Wilkerson ............................. 363/41 |
| 6,115,267 | * | 9/2000 | Herbert ................................. 363/25 |

OTHER PUBLICATIONS

"A High–Performance Single–Phase Rectifier with Input Power Factor Correction" by Roberto Martinez & Prasad N. Enjeti; 1996; IEEE; pp. 311–317, Mar. 1996.

"High Power Factor Preregulators for Off–Line Power Supplies" by Lloyd H. Dixon, Jr.; Unitrode Seminar 1995; 7 pages, No Date Available.

"An Improved Topology of Boost Converter with Ripple Free Input Current" by Zhengyu Lu, Huiming Chen and Zhaoming Qian; 2000 IEEE; 5 pages, No Date Available.

* cited by examiner

Primary Examiner—Rajnikant D. Patel

(57) ABSTRACT

A controller or a method for regulating a non-isolated power factor corrector and a power factor corrector employing the controller or the method. The power factor corrector is adapted to provide a DC output voltage at an output thereof. The power factor corrector has first and second power switches, coupled to an input thereof, that receive unrectified AC power. In one embodiment, the controller includes: (1) a sensor, coupled proximate the input, that senses a polarity of the unrectified AC power and (2) a drive circuit, coupled to the sensor, that: (2a) closes the first power switch and modulates the second power switch to regulate the DC output voltage when the polarity is negative, and (2b) closes the second power switch and modulates the first power switch to continue to regulate the DC output voltage when the polarity is positive.

21 Claims, 10 Drawing Sheets

US 6,282,109 B1

CONTROLLER FOR A NON-ISOLATED POWER FACTOR CORRECTOR AND METHOD OF REGULATING THE POWER FACTOR CORRECTOR

TECHNICAL FIELD OF THE INVENTION

The present invention is directed, in general, to power conversion and, more specifically, to a non-isolated power factor corrector and method of regulating the non-isolated power factor corrector.

BACKGROUND OF THE INVENTION

A power converter is a power processing circuit that converts an input voltage or current source waveform into a specified output voltage or current waveform. A switched-mode power converter is a frequently employed power converter that converts an input voltage waveform into a specified output voltage waveform. A boost converter is one example of a switched-mode power converter that is typically employed in off-line applications wherein power factor correction and total harmonic distortion (THD) reduction at the input and a stable, regulated voltage at the output are desired.

A non-isolated power factor correction (PFC) boost converter generally includes a boost inductor and a power switch coupled to the boost inductor. The boost converter further includes a rectifying diode coupled to a node between the boost inductor and the power switch. The boost converter still further includes an output capacitor coupled across an output of the boost converter. The output capacitor is usually large to ensure a constant output voltage. A load is then connected in parallel across the output capacitor. The output voltage (measured at the load) of the boost converter is always greater than the input voltage.

The boost converter generally operates as follows. The power switch is closed (conducting) for a first interval D (D interval). The rectifying diode is reverse-biased, isolating the output capacitor and, therefore, the load from the input of the boost converter. During this interval, the input voltage supplies energy to charge the boost inductor and the inductor current increases. Since the load is isolated from the input voltage, a stored charge in the output capacitor powers the load. Then, for a second interval 1-D (1-D interval), the power switch is opened (non-conducting). The inductor current decreases as energy from both the boost inductor and the input flows forward through the rectifying diode to charge the output capacitor and power the load. By varying a duty cycle of the power switch, the output voltage of the boost converter may be controlled.

The boost converter may be operated in three modes: continuous conduction mode (CCM), discontinuous conduction mode (DCM) or critical mode (CM). The modes are defined by characteristics of the inductor current. More specifically, in CCM, the inductor current is unidirectional and is always greater than zero. In DCM, the inductor current is unidirectional and is equal to zero for a period of time during each switching cycle. In CM, the inductor current is unidirectional and reaches zero only for an instant during each switching cycle.

As previously mentioned, the boost converter, when employed as a power factor corrector, generally provides adequate power factor correction. The power factor is defined as a ratio of the actual power delivered to the load to a product of the voltage and current at the input of the boost converter. The conventional boost converter, however, cannot directly process the AC power available from the AC line. An input full wave rectifier bridge is required at the input of the boost converter to rectify the AC voltage from the AC line. The rectified AC voltage may then be processed by the boost converter. The rectifier bridge is subject to dissipative losses, particularly at low AC line voltages (e.g., 85 to 100 VAC). Power dissipation in the bridge diodes of the rectifier bridge may be as high as 2 to 3% of the total power processed by the power converter. Further, the rectifier bridge may contribute to electromagnetic interference noise generated by the power converter.

As discussed above, the boost converter also contains its own rectifier circuitry, namely, the rectifying diode coupled between the boost inductor and the output capacitor. The rectifying diode may be subject to conduction losses that reduce the efficiency of the boost converter. The combination of AC line rectification (by the rectifier bridge) and switching frequency rectification (by the rectifying diode of the boost converter) reduces the efficiency of the overall power conversion process. Further, while the boost converter provides adequate power factor correction, the output voltage of the boost converter is necessarily greater than the input voltage. The resulting high output voltage may adversely affect the efficiency of other devices to which the boost converter may be connected.

Accordingly, what is needed in the art is a power converter and a controller and method for operation the power converter that overcomes the deficiencies of the prior art.

SUMMARY OF THE INVENTION

To address the above-discussed deficiencies of the prior art, the present invention provides a controller or method for regulating a non-isolated power factor corrector, and a power factor corrector employing the controller or the method. The power factor corrector is adapted to provide a DC output voltage at an output thereof. The power factor corrector has first and second power switches, coupled to an input thereof, that receive unrectified AC power. In one embodiment, the controller includes: (1) a sensor, coupled proximate the input, that senses a polarity of the unrectified AC power and (2) a drive circuit, coupled to the sensor, that: (2a) closes the first power switch and modulates the second power switch to regulate the DC output voltage when the polarity is negative, and (2b) closes the second power switch and modulates the first power switch to continue to regulate the DC output voltage when the polarity is positive.

The present invention introduces, in one aspect, the concept of closing one of the first and second power switches of a power factor corrector during alternate half-cycles of the unrectified AC power and modulating the other power switch to regulate the DC output voltage. By alternately closing one of the first and second power switches, the power factor corrector may be continually adapted to operate with both the positive and negative polarities of the AC power. The power factor corrector may thus avoid, for instance, the use of an input full wave rectifier bridge (or other rectifier topologies) for AC line rectification and the inefficiencies associated therewith.

In one embodiment of the present invention, the sensor is a voltage sensor that senses a polarity of the AC voltage. Those skilled in the pertinent art are familiar with a variety of sensors for sensing voltage polarities, e.g., a comparator or a Schmidt trigger device.

In one embodiment of the present invention, the controller further includes an input current sensor that develops an input current signal representative of an input current to the power factor corrector. The controller operates the first and second power switches based on the input current signal to correct the power factor (i.e., the shape of the input current). Power factor correction is generally desired in off-line applications.

In one embodiment of the present invention, the controller further includes an output voltage sensor that develops an output voltage signal representative of the DC output voltage. The controller operates the first and second power switches based on the output voltage signal to regulate the DC output voltage of the power factor corrector. In a related embodiment, the controller is a pulse-width modulated controller. The drive circuit may thus provide pulse-width modulated drive signals to drive the first or second power switches. In an alternative embodiment, the drive circuit provides a single pulse-width modulated drive signal. The controller further includes a steering circuit that steers the drive signal to an appropriate one of the first and second power switches based on the polarity. Those skilled in the pertinent art are familiar with pulse-width modulation. Of course, other schemes for driving the first and second power switches are well within the broad scope of the present invention.

In one embodiment, the power factor corrector employs topologies selected from the group consisting of (1) boost topologies, (2) topologies having capacitive coupling between said input and said output (so called "Cuk"), (3) SEPIC topologies, (4) flyback topologies and (5) Zeta topologies. Of course, other non-isolated power factor topologies not listed above are well within the broad scope of the present invention.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
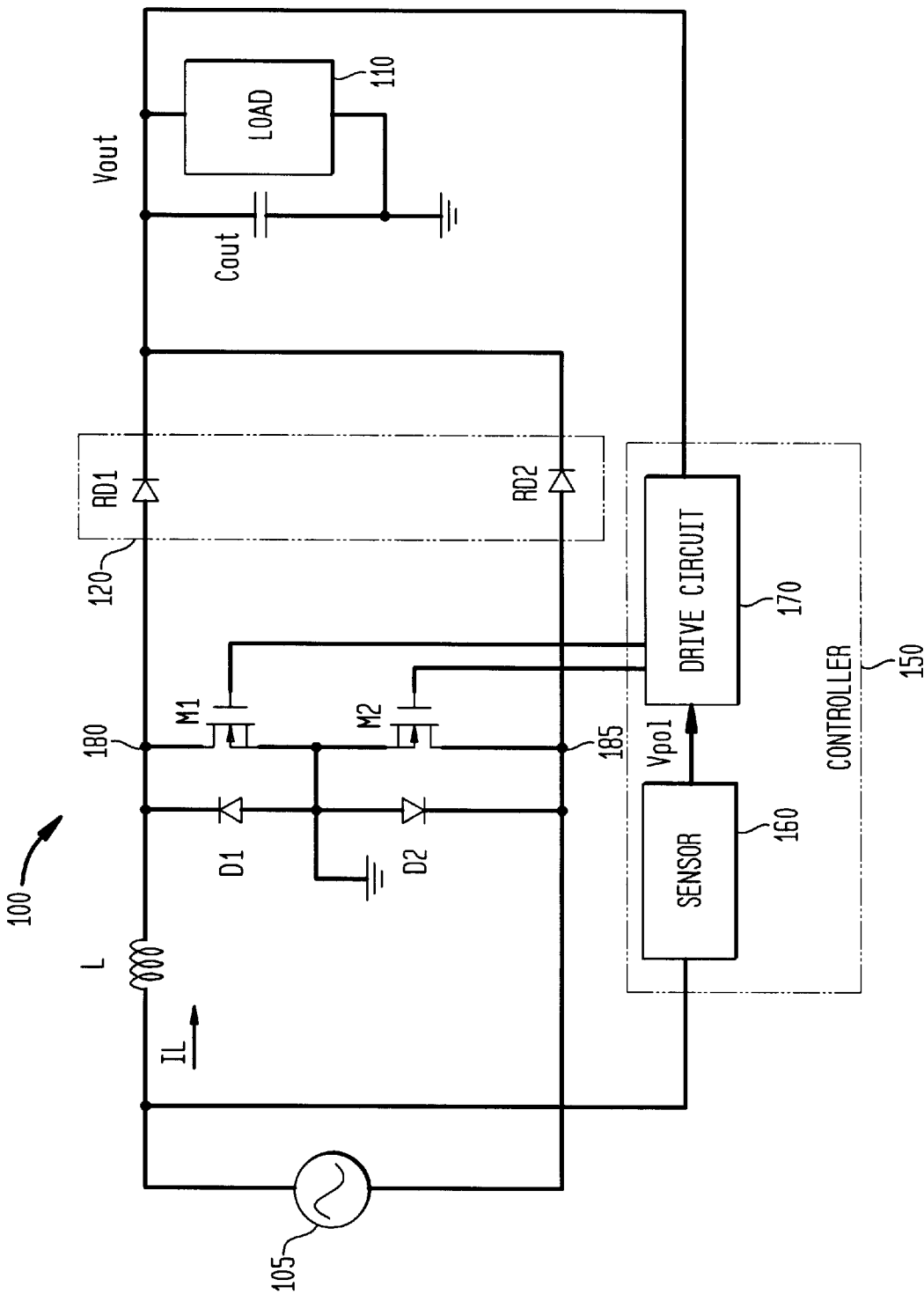
FIG. 1 illustrates a schematic diagram of an embodiment of a non-isolated power factor corrector constructed in accordance with the principles of the present invention.

Referring initially to FIG. 1, illustrated is a schematic diagram of an embodiment of a non-isolated power factor corrector 100 constructed in accordance with the principles of the present invention. The power factor corrector 100 has an input couplable to a source of AC power 105 and an output couplable to a load 110. The power factor corrector 100 is employable in off-line applications and is advantageously designed to receive unrectified AC power directly from the source of AC power 105. The power factor corrector 100 thus does not require an input full wave rectifier bridge to rectify the AC power and thereby advantageously avoids dissipative losses that would be incurred with respect to the bridge diodes of the input full wave rectifier bridge.

The power factor corrector 100 includes first and second power switches M1, M2 coupled to the input. In the illustrated embodiment, the first and second power switches M1, M2 are metal oxide semiconductor field effect transistors (MOSFETs), each having an intrinsic body diode (explicitly illustrated and designated as D1, D2). Of course, other controllable switches, such as bipolar junction transistors (BJTs) and gallium arsenide field-effect transistors (GaAsFETs), are well within the broad scope of the present invention.

The power factor corrector 100 further includes an inductor L coupled between the input and the first power switch M1. The power factor corrector 100 further includes an output rectifier 120 having first and second rectifying diodes RD1, RD2, respectively coupled to the first and second power switches M1, M2. The power factor corrector 100 further includes an output capacitor Cout coupled across the output. The output capacitor Cout supports an output voltage Vout to the load 110.

The power factor corrector 100 still further includes a controller 150 coupled to the first and second power switches M1, M2. In the illustrated embodiment, the controller 150 includes a sensor 160, coupled to the input, that senses a polarity of the unrectified AC power. Of course, the sensor 160 need not be coupled directly to the input as illustrated in the present embodiment. The controller 150 further includes a drive circuit 170, coupled to the sensor 160, that provides drive signals to the first and second power switches M1, M2 based on the polarity of the AC power. In the illustrated embodiment, the sensor 160 is a voltage sensor coupled to the input of the power factor corrector 100. The sensor 160 senses a polarity of the AC power and develops therefrom a polarity signal Vpol for use by the drive circuit 170. Of course, the power factor corrector 100 may employ other polarity sensors and remain well within the broad scope of the present invention.

The power factor corrector 100 operates as follows. During a first half-cycle, wherein the polarity of the AC power is negative, the drive circuit 170 closes the first power switch M1 and modulates the second power switch M2 to regulate the output voltage Vout of the power factor corrector 100. With the first power switch M1 closed (conducting), a first node 180 between the first power switch M1 and the first rectifying diode RD1 is coupled to a negative reference level (e.g., ground), effectively removing the first power switch M1 and the first rectifying diode RD1 from the circuit. For a D interval (of a duty cycle associated with the first half-cycle), the second power switch M2 is closed (conducting) to place the inductor L across the source of AC power 105. An inductor current IL ramps up, storing energy in the inductor L during the D interval. Then, during a 1-D interval (of the duty cycle associated with the first half-cycle), the second power switch M2 is open (non-conducting). The inductor L discharges the stored energy into the output capacitor Cout and the load 110 through the second rectifying diode RD2. The drive circuit 170 monitors the output voltage Vout and adjusts the duty cycle of the second power switch M2 to regulate the output voltage Vout.

Then, during a second half-cycle, wherein the polarity of the AC power is positive, the drive circuit 170 closes the second power switch M2 and modulates the first power switch M1 to continue to regulate the output voltage Vout. With the second power switch M2 closed, a second node 185 between the second power switch M2 and the second rectifying diode RD2 is coupled to the negative reference level, effectively removing the second power switch M2 and the second rectifying diode RD2 from the circuit. For a D interval (of a duty cycle associated with the second half-cycle), the second power switch M2 is closed to place the inductor L across the source of AC power 105. As before, the inductor current IL ramps up, storing energy in the inductor L during the D interval. The direction of the inductor current IL during the second half-cycle, however, may be opposite to the direction of the inductor current IL during the first half-cycle discussed above. Then, during a 1-D interval (of the duty cycle associated with the second half-cycle), the first power switch M1 is open. The inductor L discharges the stored energy into the output capacitor Cout and the load 110 through the first rectifying diode RD1. The drive circuit 170 monitors the output voltage Vout and adjusts the duty cycle of the first power switch M1 to continue to regulate the output voltage Vout.

Thus, the drive patterns of the first and second power switches M1, M2 are alternated every half-cycle. By closing one of the first or second power switches M1, M2 for substantially all of the duration of each half-cycle, the topology of the power factor corrector 100 may be advantageously reduced to that approximating a conventional boost converter, with the appropriate components available to process either the positive or negative polarity AC power. The power factor corrector 100 may thus be employed in off-line applications without the use of an input full wave rectifier bridge, which was generally required by power factor correctors of the prior art.

Figure 2:
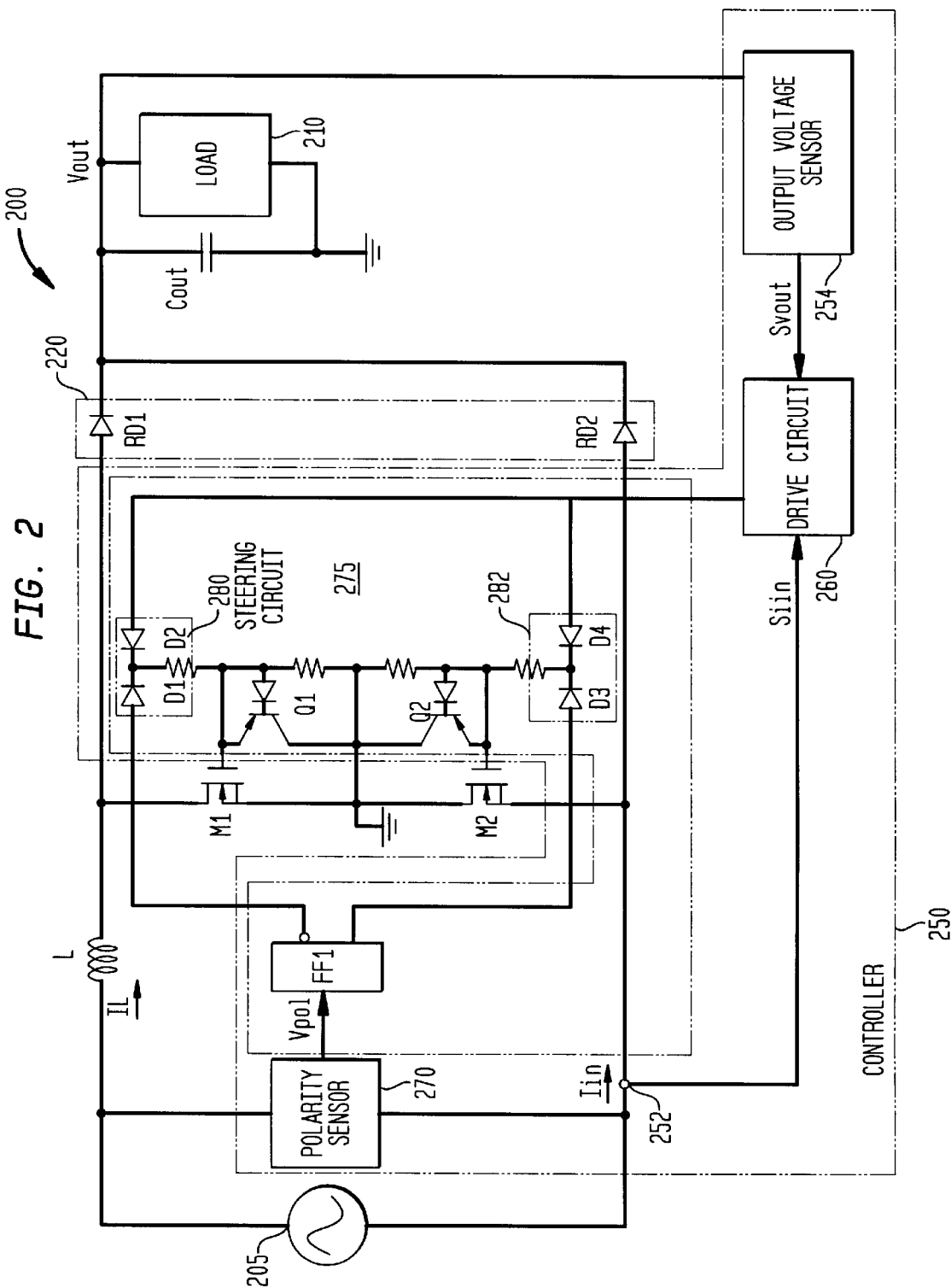
FIG. 2 illustrates a schematic diagram of another embodiment of a non-isolated power factor corrector constructed in accordance with the principles of the present invention.

Turning now to FIG. 2, illustrated is a schematic diagram of another embodiment of a non-isolated power factor corrector 200 constructed in accordance with the principles of the present invention. The power factor corrector 200 has an input couplable to a source of AC power 205 and an output couplable to a load 210. The power factor corrector 200 includes first and second power switches M1, M2 coupled to the input. The power factor corrector 200 further includes an inductor L coupled between the input and the first power switch M1. The power factor corrector 200 further includes an output rectifier 220, having first and second rectifying diodes RD1, RD2, coupled to the first and second power switches M1, M2. The power factor corrector 200 further includes an output capacitor Cout coupled across the output. The output capacitor Cout supports an output voltage Vout to the load 210.

The power factor corrector 200 still further includes a controller 250 coupled to the first and second power switches M1, M2. In the illustrated embodiment, the controller 250 includes an input current sensor 252, coupled to the input of the power factor corrector 200. The input current sensor 252 develops an input current signal Siin representative of the input current Iin. The controller 250 further includes an output voltage sensor 254, coupled to the output of the power factor corrector 200, that develops an output voltage signal Svout representative of the output voltage Vout.

The controller 250 further includes a drive circuit 260 that receives the input current signal Siin and the output voltage signal Svout and develops therefrom a pulse-width modulated drive signal for driving the first and second power switches M1, M2. By monitoring both the input current Iin and the output voltage Vout, the power factor corrector 200 may correct the power factor (i.e., the shape of the input current) while maintaining the output voltage Vout at a substantially constant level despite fluctuations in either the input AC power or the load 210. While the illustrated drive circuit 260 employs a pulse-width modulated drive signal to alternatively drive the first and second power switches M1, M2, other drive circuits not employing pulse-width modulation are well within the broad scope of the present invention.

Portions of the drive circuit 260 may be embodied in an integrated circuit, such as the UC3854 manufactured by Unitrode Corporation of Merrimack, N.H. The UC3854 is an example of an integrated circuit that may be employed to advantage in some embodiments of the present invention. Of course, other controllers may be employed and still be well within the broad scope of the present invention.

The controller 250 further includes a polarity sensor 270, coupled across the input of the power factor corrector 200, that senses a polarity of the input AC power. The polarity sensor 270 develops a polarity signal Vpol indicative of the polarity of the input AC power. The controller 250 further includes a steering circuit 275 coupled to the polarity sensor 270. The steering circuit 275 receives the polarity signal Vpol and accordingly steers the drive signal from the drive circuit 260 to the appropriate one of the first and second power switches M1, M2 depending on the polarity signal Vpol.

In the illustrated embodiment, the steering circuit 275 includes a bistable circuit (flip-flop FF1) coupled to the sensor 260. The flip-flop FF1 receives the polarity signal Vpol and accordingly provides inverted and non-inverted outputs based thereon. The steering circuit 275 further includes a first OR-ing circuit 280, having first and second diodes D1, D2, coupled between the inverted output of the flip-flop FF1 and a drive signal output of the drive circuit 260. The steering circuit 275 further includes a second OR-ing circuit 282, having third and fourth diodes D3, D4, coupled between the non-inverted output of the flip-flop FF1 and the drive signal output of the drive circuit 260. The steering circuit 275 further includes a first drive switch Q1 (and its associated components) coupled between the first OR-ing circuit 280 and the first power switch M1. The steering circuit 275 still further includes a second drive switch Q2 (and its associated components) coupled between the second OR-ing circuit 282 and the second power switch M2. While the illustrated embodiment of the steering circuit 275 employs OR-ing circuits 280, 282 and drive switches Q1, Q2, other circuits capable of steering the drive signal to the appropriate power switches are well within the broad scope of the present invention.

The power factor corrector 200 operates as follows. During a first half-cycle, wherein the polarity of the AC power is negative, the polarity signal Vpol is low (i.e., logic 0). The inverted output of the flip-flop FF1 is high (i.e., logic 1), while the non-inverted output is low. At the first OR-ing circuit 280, the high logic signal from the inverted output of the flip-flop FF1 effectively overrides the drive signal from the drive circuit 260, resulting in a high logic signal to both the first power switch M1 and the first drive switch Q1. The first power switch M1 is thus closed (conducting) during the first half-cycle. The first drive switch Q1 is open (non-conducting) during the first half-cycle and does not affect the operation of the first power switch M1.

During the first half-cycle, the non-inverted output of the flip-flop FF1 is low. The drive signal from the drive circuit 260 therefore passes through the second OR-ing circuit 282 to drive the second power switch M2. Within the first half-cycle, the drive signal is high for a D interval (of a duty cycle) of the drive signal. The second power switch M2 is closed (and the second drive switch Q2 is open) to place the inductor L across the source of AC power 205. An inductor current IL ramps up, storing energy in the inductor L. Then, during a 1-D interval (of the duty cycle associated with the first half-cycle), second drive switch Q2 closes, causing the second power switch M2 to open. The inductor L now discharges the stored energy into the output capacitor Cout and the load 210 through the second rectifying diode RD2 of the output rectifier 220.

Then, during a second half-cycle, wherein the polarity of the AC power is positive, the polarity signal Vpol is high. The inverted output of the flip-flop FF1 is now low, while the non-inverted output is high. At the first OR-ing circuit 280, the low logic signal from the inverted output of the flip-flop FF1 allows the drive signal from the drive circuit 260 to pass through the first OR-ing circuit 280 to drive the first power switch M1. Within the second half-cycle, the drive signal is high for a D interval (of a duty cycle of the drive signal). The first power switch M1 is closed (the first drive switch Q2 is open) to place the inductor L across the source of AC power 205. The inductor current IL ramps up, storing energy in the inductor L. Then, during a 1-D interval (of the duty cycle associated with the second half-cycle), the first drive switch Q1 closes, causing the first power switch M1 to open. The inductor L now discharges the stored energy into the output capacitor Cout and the load 210 through the first rectifying diode RD1 of the output rectifier 220.

During the second half-cycle, the non-inverted output of the flip-flop FF1 is high, effectively overriding the drive signal from the drive circuit 260 and resulting in a high logic signal to both the second power switch M2 and the second drive switch Q2. The second power switch M2 is thus closed (conducting) during the second half-cycle. The second drive switch Q2 is open (non-conducting) during the second half-cycle and does not affect the operation of the second power switch M2. The steering circuit 275 may thus steer the drive signal to the appropriate one of the first and second power switches M1, M2 depending on the polarity of the AC power.

Figure 3:
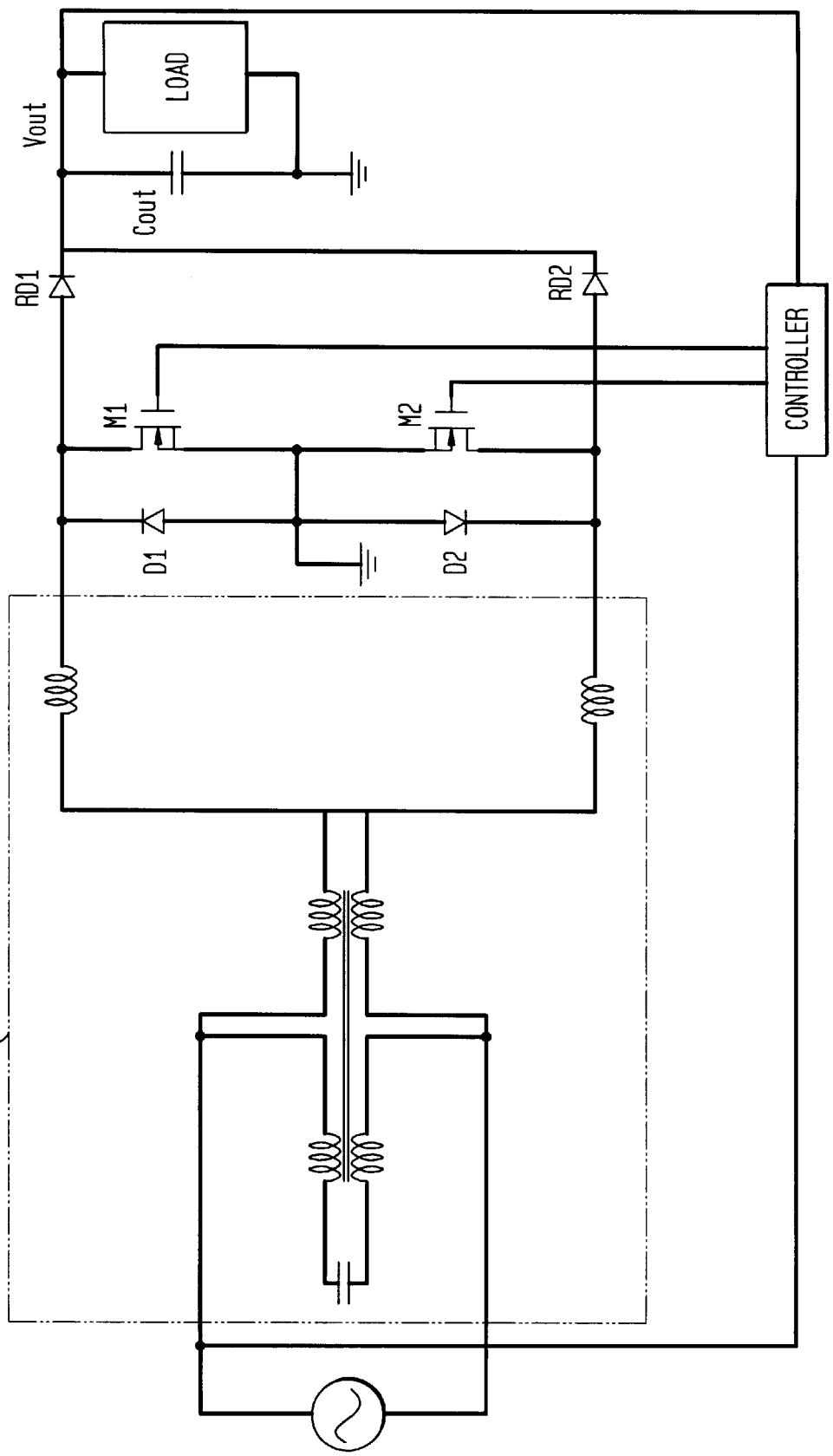
FIG. 3 illustrates a schematic diagram of another embodiment of a non-isolated power factor corrector constructed in accordance with the principles of the present invention.

Turning now to FIG. 3, illustrated is a schematic diagram of another embodiment of a non-isolated power factor corrector 300 constructed in accordance with the principles of the present invention. The power factor corrector 300 is substantially similar to the power factor corrector 100 illustrated and described with respect to FIG. 1 and, as a result, will not be described in detail.

The power factor corrector 300 is adapted to receive unrectified AC power and, therefore, does not require the use of an input full wave rectifier bridge to rectify the AC power. As a result, the power factor corrector 300 may employ a magnetically coupled filter (MCF) 310 to reduce electromagnetic interference. The MCF 310 is capable of performing both the functions of filtering and energy storage and transfer. First and second leakage inductors Lk1, Lk2 may represent the leakage inductance of the MCF 310 or, alternatively, may be additional inductors.

Figure 4:
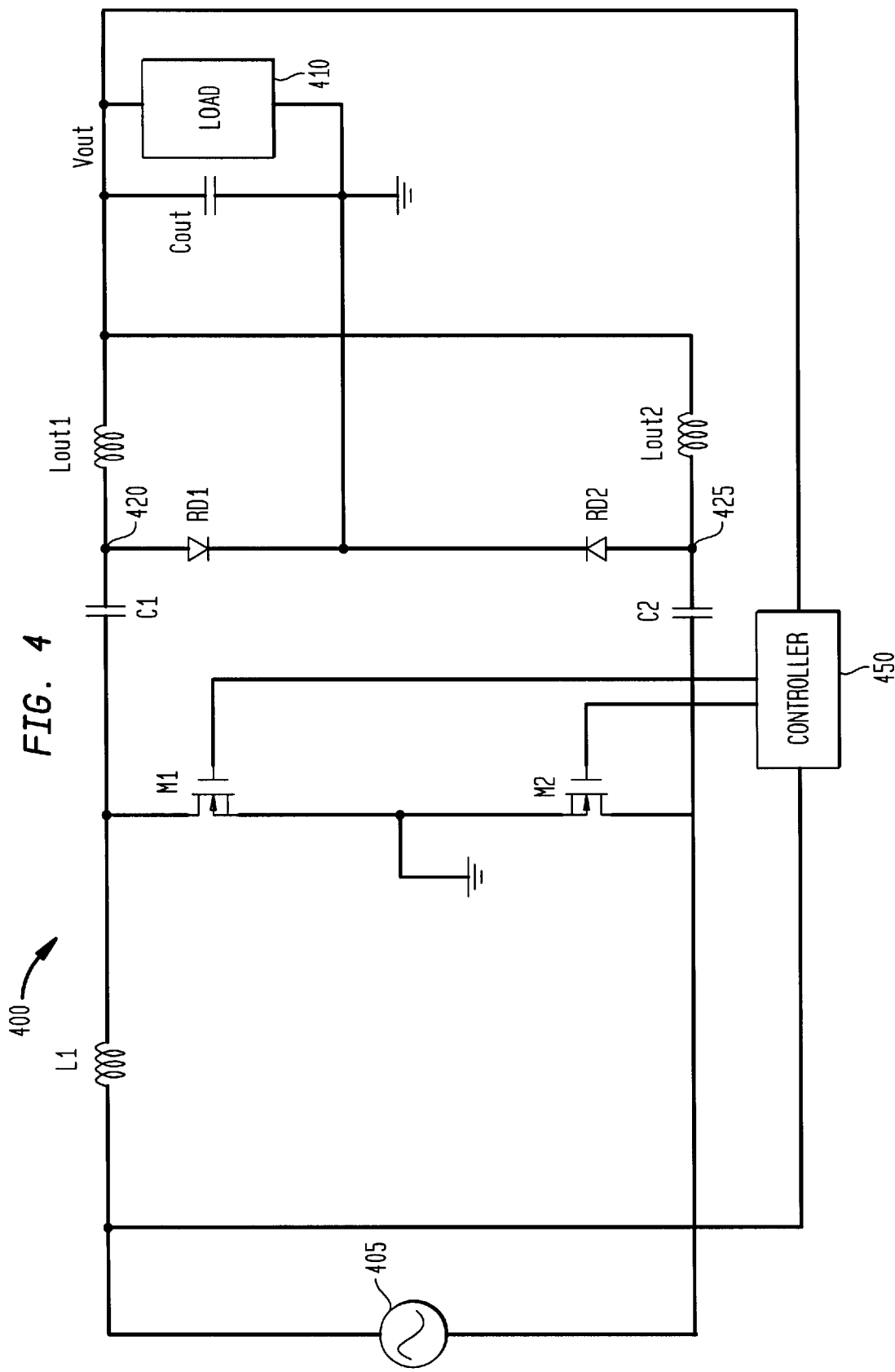
FIG. 4 illustrates a schematic diagram of another embodiment of a non-isolated power factor corrector constructed in accordance with the principles of the present invention.

Turning now to FIG. 4, illustrated is a schematic diagram of another embodiment of a non-isolated power factor corrector 400 constructed in accordance with the principles of the present invention. The power factor corrector 400 employs a topology having capacitive-coupling between an input and an output of the power factor corrector 400.

In the illustrated embodiment, the input of the power factor corrector 400 is couplable to a source of AC power 405. The output of the power factor corrector 400 is couplable to a load 410. The power factor corrector 400 includes first and second power switches M1, M2 coupled to the input. The power factor corrector 400 further includes a first inductor L1 coupled between the input and the first power switch M1. The power factor corrector 400 further includes first and second capacitors C1, C2, respectively coupled between the first and second power switches M1, M2 and the output. The power factor corrector 400 further includes first and second rectifying diodes RD1, RD2, respectively coupled to the first and second capacitors C1, C2.

The power factor corrector 400 still further includes a first output inductor Lout1 coupled to a first node 420 between the first capacitor C1 and the first rectifying diode RD1. The power factor corrector 400 further includes a second output inductor Lout2 coupled to a second node 425 between the second capacitor C2 and the second rectifying diode RD2. The power factor corrector 400 further includes an output capacitor Cout coupled across the output. The output capacitor Cout is employed to support the output voltage Vout during the D interval. The power factor corrector 400 still further includes a controller 450 coupled to the first and second power switches M1, M2. The controller 450 monitors the output voltage Vout, the input current and the polarity of the input AC power and accordingly operates the first and second power switches M1, M2 to regulate the output voltage Vout and provide power factor correction of the input AC power.

The power factor corrector 400 operates as follows. The controller 450, including a sensor and a drive circuit (not explicitly illustrated), senses a polarity of the input AC power and accordingly provides first and second drive signals to the first and second power switches M1, M2 based on the polarity.

During a first half-cycle, wherein the polarity of the input AC power is negative, the controller 450 closes the first power switch M1 and modulates the second power switch M2 to regulate the output voltage Vout of the power factor corrector 400. Then, during a second half-cycle, wherein the polarity of the AC power is positive, the controller 450 closes the second power switch M2 and modulates the first power switch M1 to continue to regulate the output voltage Vout.

The drive patterns of the first and second power switches M1, M2 are thus alternated every half-cycle. By closing one of the first or second power switches M1, M2 for substantially all of the duration of each half-cycle, the topology of the power factor corrector 400 may be advantageously reduced to that approximating a converter topology having capacitive-coupling between the input and the output (a so-called "Cuk" topology).

Figure 5:
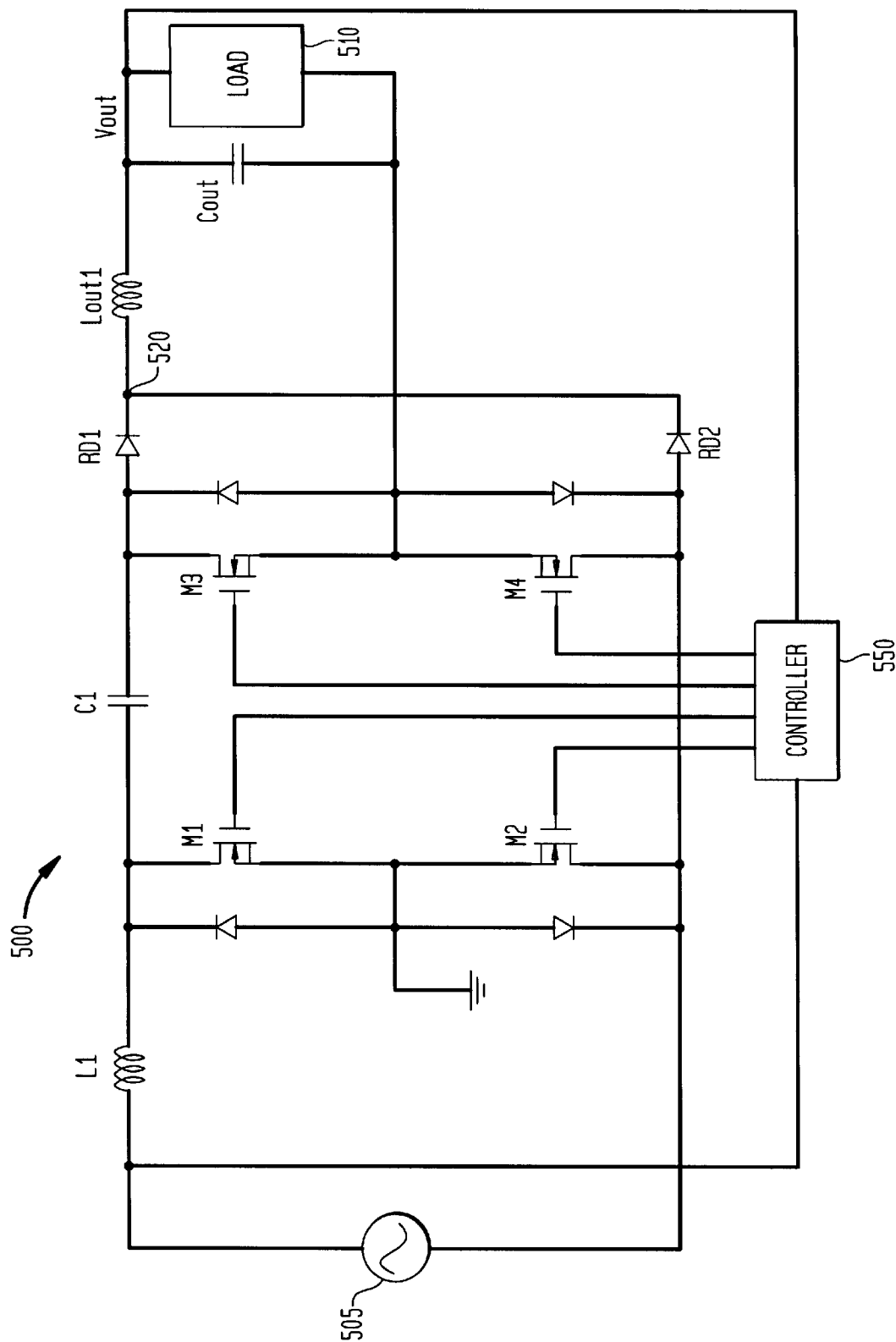
FIG. 5 illustrates a schematic diagram of another embodiment of a non-isolated power factor corrector constructed in accordance with the principles of the present invention.

The power factor corrector 400 illustrated and described with respect to FIG. 4 is capable of producing only a negative output voltage Vout. Turning now to FIG. 5, and with continuing reference to FIG. 4, illustrated is a schematic diagram of another embodiment of a non-isolated power factor corrector 500 constructed in accordance with the principles of the present invention. Analogous to the power factor corrector 400, the power factor corrector 500 employs a topology having capacitive-coupling between an input and an output of the power factor corrector 500.

The power factor corrector 500 has an input couplable to a source of AC power 505 and an output couplable to a load 510. The power factor corrector 500 includes a first inductor L1 coupled to the input. The power factor corrector 500 further includes first and second power switches M1, M2 coupled to the first inductor L1. The power factor corrector 500 further includes a capacitor C1 coupled to the first power switch M1. The power factor corrector 500 further includes third and fourth power switches M3, M4 coupled to the capacitor C1. The power factor corrector 500 further includes first and second rectifying diodes RD1, RD2, respectively coupled to the third and fourth power switches M3, M4. The power factor corrector 500 further includes an output inductor Lout coupled to node 520 between the first and second rectifying diodes RD1, RD2. The power factor corrector 500 further includes an output capacitor Cout coupled across the output.

The power factor corrector 500 still further includes a controller 550 coupled to the first, second, third and fourth power switches M1, M2, M3, M4. The controller 550 monitors the output voltage Vout, the input current and the polarity of the input AC power and accordingly operates the first, second, third and fourth power switches M1, M2, M3, M4 to regulate the output voltage Vout and provide power factor correction of the input AC power.

The power factor corrector 500 advantageously employs fewer capacitive and inductive elements than the power factor corrector 400 and is capable of producing positive output voltages Vout. The operation of the power factor corrector 500 is similar to the operation of the power factor corrector 400 and, as a result, will not be described.

Figure 6:
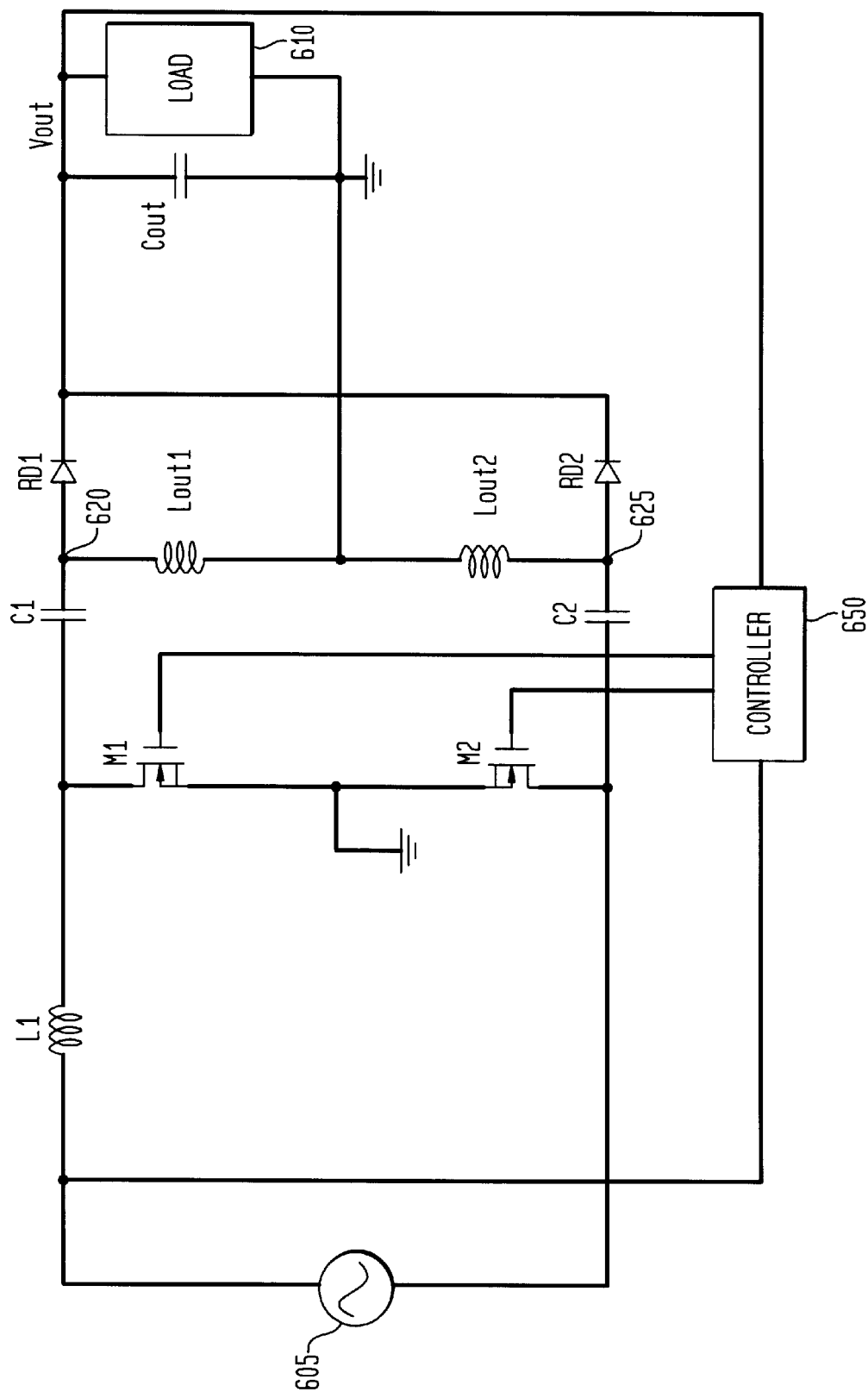
FIG. 6 illustrates a schematic diagram of another embodiment of a non-isolated power factor corrector constructed in accordance with the principles of the present invention.

Turning now to FIG. 6, illustrated is a schematic diagram of another embodiment of a non-isolated power factor corrector 600 constructed in accordance with the principles of the present invention. The power factor corrector 600 has an input couplable to a source of AC power 605 and an output couplable to a load 610. The power factor corrector 600 includes first and second power switches M1, M2 coupled to the input. The power factor corrector 500 further includes a first inductor L1 coupled between the input and the first power switch M1. The power factor corrector 600 further includes first and second capacitors C1, C2, respectively coupled between the first and second power switches M1, M2 and the output. The power factor corrector 600 further includes first and second output inductors Lout1, Lout2, respectively coupled to the first and second capacitors C1, C2.

The power factor corrector 600 still further includes a first rectifying diode RD1 coupled to a first node 620 between the first capacitor C1 and the first output inductor Lout1. The power factor corrector 600 further includes a second rectifying diode RD2 coupled to a second node 625 between the second capacitor C2 and the second output inductor Lout2. The power factor corrector 600 further includes an output capacitor Cout coupled across the output. The output capacitor Cout supports an output voltage Vout to the load 610. The power factor corrector 600 still further includes a controller 650 coupled to the first and second power switches M1, M2. The controller 650 monitors the output voltage Vout, the input current and the polarity of the input AC power and accordingly operates the first and second power switches M1, M2 to regulate the output voltage Vout and provide power factor correction of the input AC power.

The operation of the power factor corrector 600 is analogous to that of the power factor corrector 100 illustrated and described with respect to FIG. 1. The power factor corrector 600, however, employs a SEPIC topology in lieu of the boost topology of the power factor corrector 100.

Figure 7:
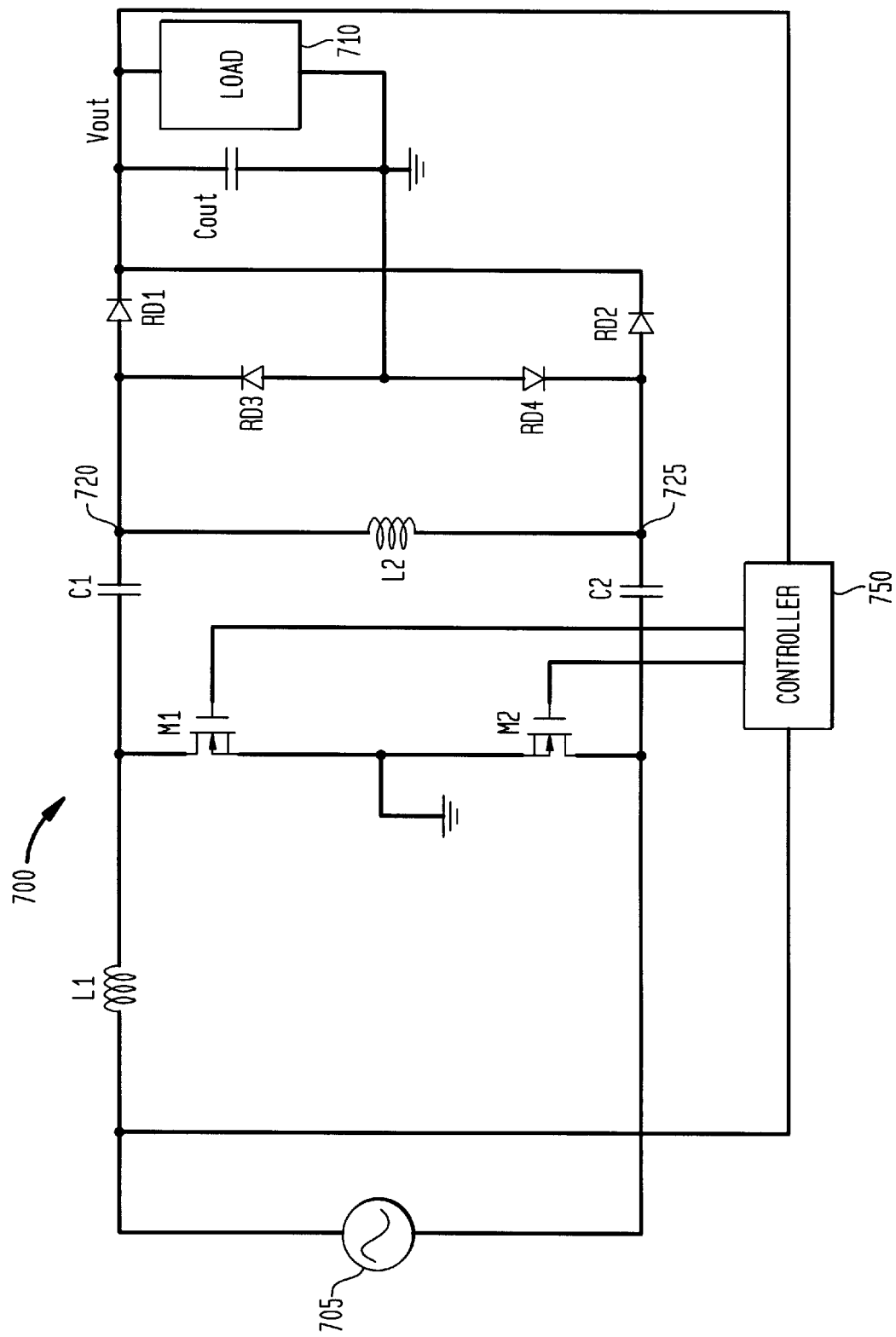
FIG. 7 illustrates a schematic diagram of another embodiment of a non-isolated power factor corrector constructed in accordance with the principles of the present invention.

The power factor corrector 600 illustrated and described with respect to FIG. 6 is capable of producing only a positive output voltage Vout. Turning now to FIG. 7, and with continuing reference to FIG. 6, illustrated is a schematic diagram of another embodiment of a non-isolated power factor corrector 700 constructed in accordance with the principles of the present invention. Analogous to the power factor corrector 600, the power factor corrector 700 employs a SEPIC topology.

The power factor corrector 700 has an input couplable to a source of AC power 705 and an output couplable to a load 710. The power factor corrector 700 includes first and second power switches M1, M2 coupled to the input. The power factor corrector 700 further includes a first inductor L1 coupled between the input and the first power switch M1. The power factor corrector 700 further includes first and second capacitors C1, C2, respectively coupled between the first and second power switches M1, M2 and the output. The power factor corrector 700 further includes a second inductor L2 coupled to the first and second capacitors C1, C2.

The power factor corrector 700 further includes a first rectifying diode RD1 coupled to a first node 720 between the first capacitor C1 and the second inductor L2. The power factor corrector 700 further includes a second rectifying diode RD2 coupled to a second node 725 between the second capacitor C2 and the second inductor L2. The power factor corrector 700 further includes third and fourth rectifying diodes RD3, RD4 respectively coupled to the first and second nodes 720, 725. The power factor corrector 700 further includes an output capacitor Cout coupled across the output.

The power factor corrector 700 still further includes a controller 750 coupled to the first and second power switches M1, M2. The controller 750 monitors the output voltage Vout, the input current and the polarity of the input AC power and accordingly operates the first and second power switches M1, M2 to regulate the output voltage Vout and provide power factor correction of the input AC power. The power factor corrector 700 is advantageously capable of producing negative and positive output voltages Vout. The operation of the power factor corrector 700 is similar to the operation of the power factor corrector 600 and, as a result, will not be described.

Figure 8:
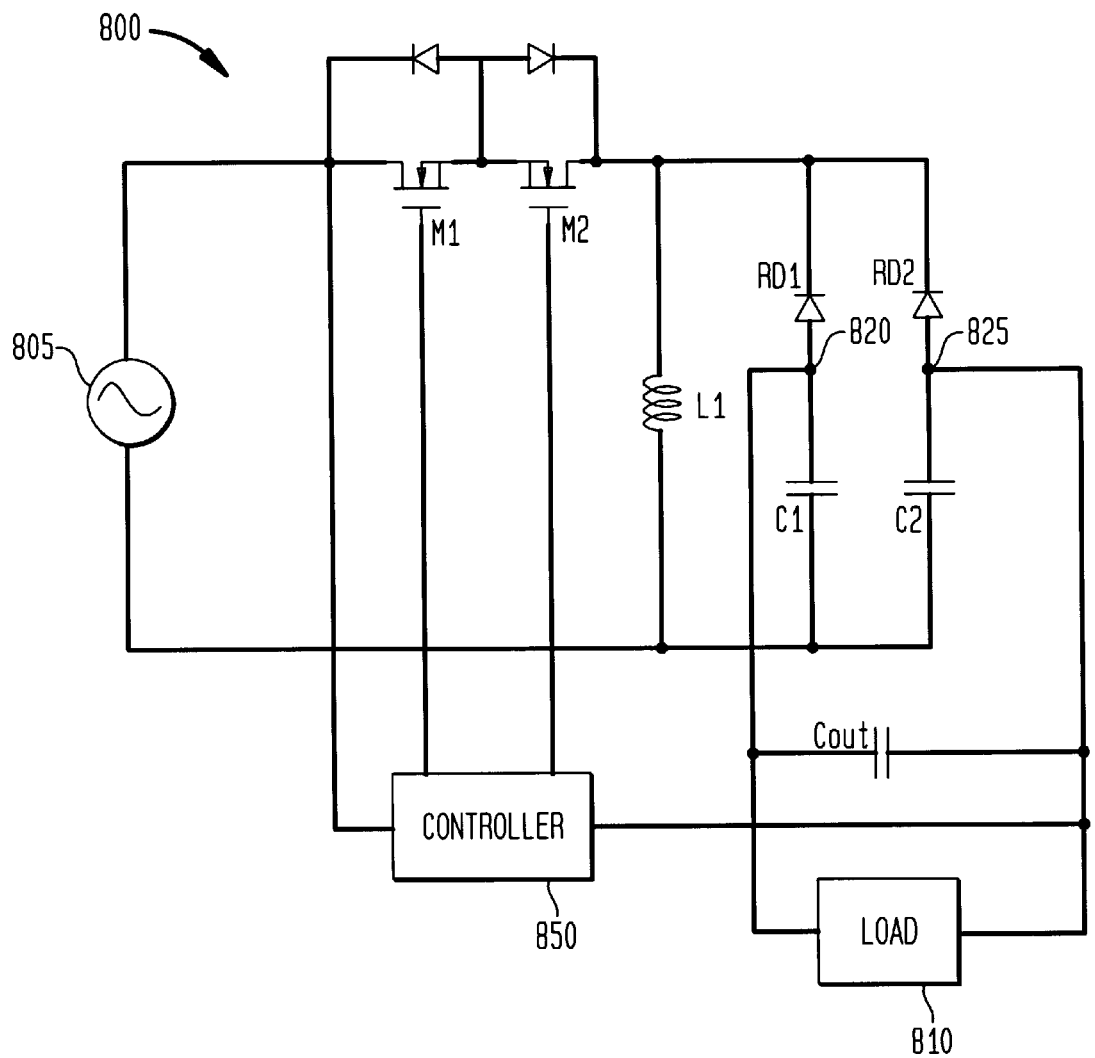
FIG. 8 illustrates a schematic diagram of another embodiment of a non-isolated power factor corrector constructed in accordance with the principles of the present invention.

Turning now to FIG. 8, illustrated is a schematic diagram of another embodiment of a non-isolated power factor corrector 800 constructed in accordance with the principles of the present invention. The power factor corrector 800 has an input couplable to a source of AC power 805 and an output couplable to a load 810. The power factor corrector 800 includes series-coupled first and second power switches M1, M2 coupled to the input. The power factor corrector 800 further includes an inductor L1 coupled to the second power switch M2. The power factor corrector 800 further includes a first capacitor C1 and a first rectifying diode RD1 coupled across the inductor L1. The power factor corrector 800 further includes a second capacitor C2 and a second rectifying diode RD2 coupled across the inductor L1.

The power factor corrector 800 further includes an output capacitor Cout coupled between a first node 820 (between the first capacitor C1 and the first rectifying diode RD1) and a second node 825 (between the second capacitor C2 and the second rectifying diode RD2). The output of the power factor corrector 800 is provided across the output capacitor Cout. The output capacitor Cout supports an output voltage Vout to the load 810. The power factor corrector 800 still further includes a controller 850 coupled to the first and second power switches M1, M2. The controller 850 monitors the output voltage Vout, the input current and the polarity of the input AC power and accordingly operates the first and second power switches M1, M2 to regulate the output voltage Vout and provide power factor correction of the input AC power.

The operation of the power factor corrector 800 is analogous to that of the power factor corrector 100 illustrated and described with respect to FIG. 1. The power factor corrector 800, however, employs a flyback topology in lieu of the boost topology of the power factor corrector 100.

Figure 9:
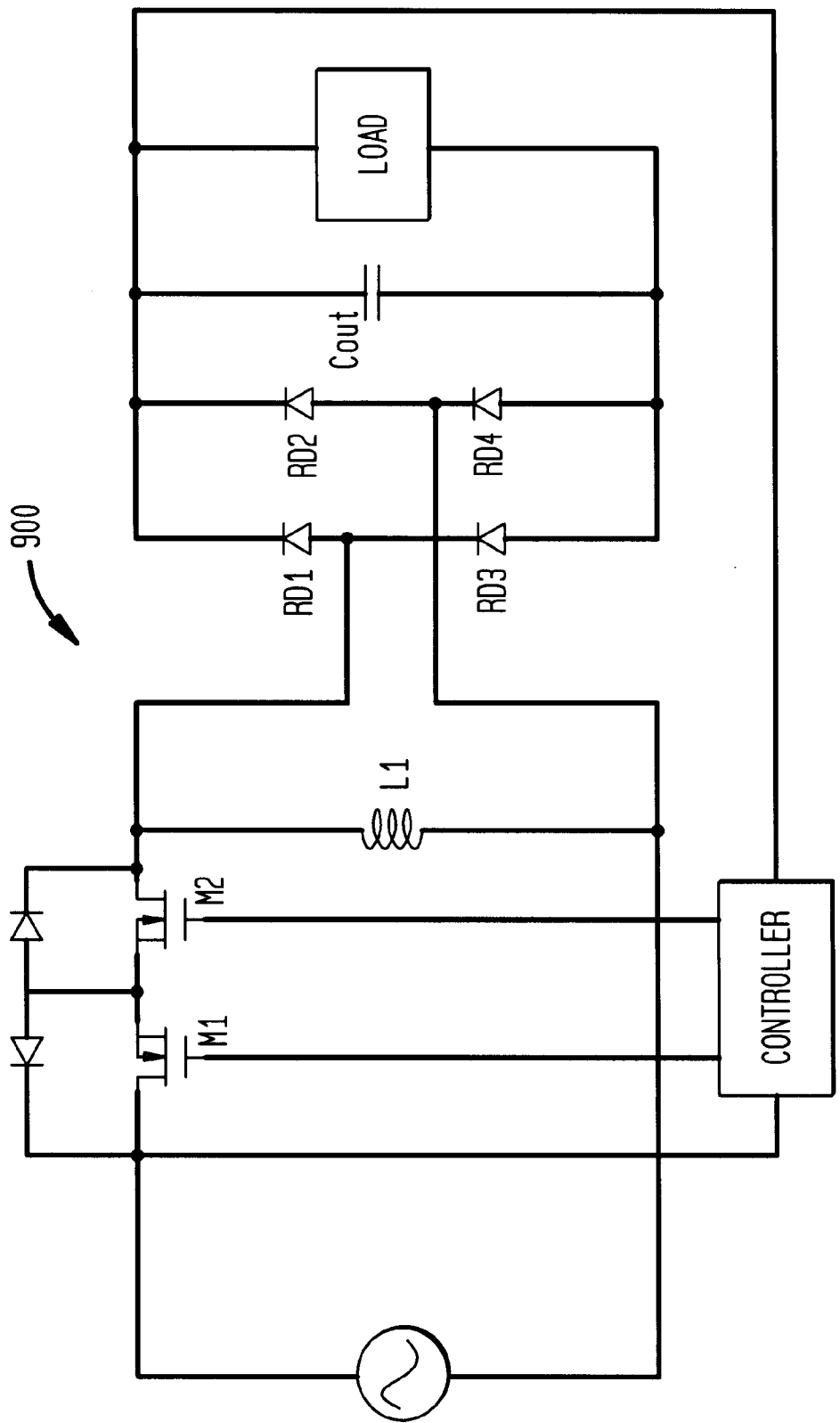
FIG. 9 illustrates a schematic diagram of another embodiment of a non-isolated power factor corrector constructed in accordance with the principles of the present invention.

Turning now to FIG. 9, illustrated is a schematic diagram of another embodiment of a non-isolated power factor corrector 900 constructed in accordance with the principles of the present invention. The power factor corrector 900 is substantially similar to the power factor corrector 800 illustrated and described with respect to FIG. 8 but employs a full bridge output rectifier topology including first, second, third and fourth rectifying diodes RD1, RD2, RD3, RD4. Of course, the use of various output rectifier topologies is well within the broad scope of the present invention.

Figure 10:
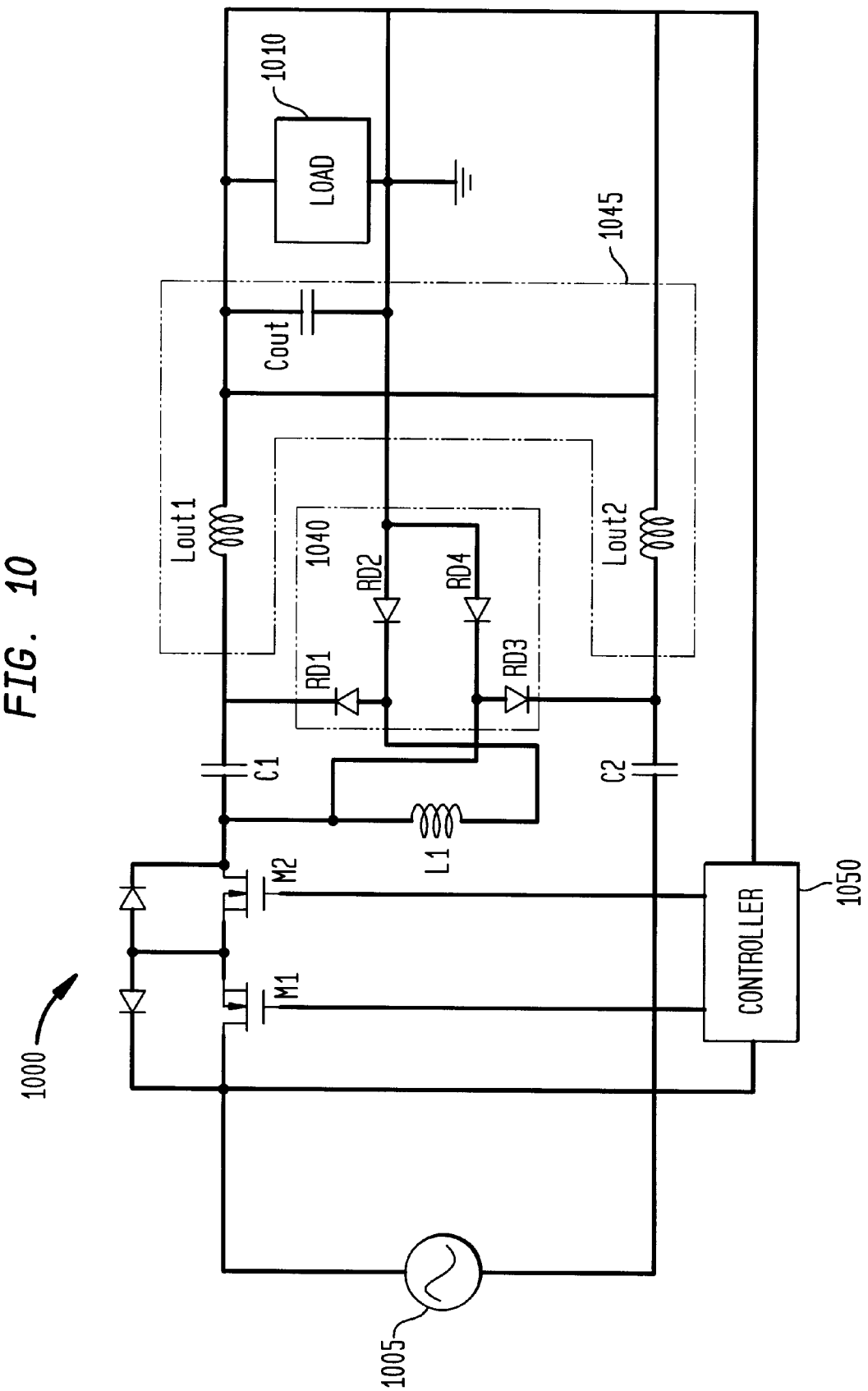
FIG. 10 illustrates a schematic diagram of yet another embodiment of a non-isolated power factor corrector constructed in accordance with the principles of the present invention.

Turning now to FIG. 10, illustrated is a schematic diagram of yet another embodiment of a non-isolated power factor corrector 1000 constructed in accordance with the principles of the present invention. The power factor corrector 1000 has an input couplable to a source of AC power 1005 and an output couplable to a load 1010. The power factor corrector 1000 includes series-coupled first and second power switches M1, M2 coupled to the input. The power factor corrector 1000 further includes an inductor L1 coupled to the second power switch M2. The power factor corrector 1000 further includes a first capacitor C1 coupled to a first node 1020 between the second power switch M2 and a first terminal of the inductor L1. The power factor corrector 100 further includes a second capacitor C2 coupled to a second terminal of the inductor L1. The power factor corrector 100 further includes an output rectifier 1040 (having first, second, third and fourth rectifying diodes RD1, RD2, RD3, RD4) coupled to the first and second capacitors C1, C2. The power factor corrector 1000 further includes an output filter 1045 (having first and second output inductor Lout1, Lout2 and an output capacitor Cout) coupled to the output rectifier 1040. The power factor corrector 1000 still further includes a controller 1050 coupled to the first and second power switches M1, M2. The controller 1050 monitors the output voltage Vout, the input current and the polarity of the input AC power and accordingly operates the first and second power switches M1, M2 to regulate the output voltage Vout and provide power factor correction of the input AC power.

The operation of the power factor corrector 1000 is analogous to that of the power factor corrector 100 illustrated and described with respect to FIG. 1. The power factor corrector 1000, however, employs a Zeta topology in place of the boost topology of the power factor corrector 100.

Those skilled in the art should understand that the previously described embodiments of the controller, the related method and the power factor corrector employing the controller or the method are submitted for illustrative purposes only and that other embodiments capable of regulating a non-isolated power factor corrector adapted to receive unregulated AC power are well within the broad scope of the present invention. Additionally, exemplary embodiments of the present invention have been illustrated with reference to specific electronic components. Those skilled in the art are aware, however, that components may be substituted (not necessarily with components of the same type) to create desired conditions or accomplish desired results. For instance, multiple components may be substituted for a single component and vice-versa. The principles of the present invention may be applied to a wide variety of power circuit topologies. For a better understanding of a variety of power converter topologies, see *Modern DC-to-DC Switchmode Power Converter Circuits*, by Rudolph P. Severns and Gordon Bloom, Van Nostrand Reinhold Company, New York, N.Y. (1985), which is incorporated herein by reference in its entirety.

Although the present invention has been described in detail, those skilled in the art should understand that they can make various changes, substitutions and alterations herein without departing from the spirit and scope of the invention in its broadest form.

What is claimed is:

1. For regulating a non-isolated power factor corrector adapted to provide a DC output voltage at an output thereof and having first and second power switches, coupled to an input of said power factor corrector, adapted to receive unrectified AC power, a controller, comprising:
   a sensor, coupled proximate said input, capable of sensing a polarity of said unrectified AC power; and
   a drive circuit, coupled to said sensor, adapted to:
      close said first power switch and modulate said second power switch to regulate said DC output voltage when said polarity is negative, and
      close said second power switch and modulate said first power switch to continue to regulate said DC output voltage when said polarity is positive.

2. The controller as recited in claim 1 wherein said sensor is a voltage sensor.

3. The controller as recited in claim 1 further comprising an input current sensor capable of developing an input current signal representative of an input current to said power factor corrector, said controller adapted to correct a power factor of said AC power based on said input current signal.

4. The controller as recited in claim 1 further comprising an output voltage sensor capable of developing an output voltage signal representative of said DC output voltage, said controller adapted to regulate said DC output voltage based on said output voltage signal.

5. The controller as recited in claim 1 wherein said drive circuit is adapted to provide pulse-width modulated drive signals to drive said first and second power switches.

6. The controller as recited in claim 1 further comprising a steering circuit adapted to steer a drive signal to an appropriate one of said first and second power switches based on said polarity.

7. The controller as recited in claim 1 wherein said power factor corrector employs topologies selected from the group consisting of:
- boost topologies;
- topologies having capacitive coupling between said input and said output;
- SEPIC topologies;
- flyback topologies; and
- Zeta topologies.

8. A method of regulating a non-isolated power factor corrector adapted to provide a DC output voltage at an output thereof and having first and second power switches, coupled to an input of said power factor corrector, that receive unrectified AC power, said method, comprising:
- sensing a polarity of said unrectified AC power;
- closing said first power switch and modulating said second power switch to regulate said DC output voltage when said polarity is negative; and
- closing said second power switch and modulating said first power switch to continue to regulate said DC output voltage when said polarity is positive.

9. The method as recited in claim 8 wherein said sensing is performed by a voltage sensor.

10. The method as recited in claim 8 further comprising:
- developing an input current signal representative of an input current to said power factor corrector; and
- correcting a power factor of said AC power based on said input current signal.

11. The method as recited in claim 8 further comprising:
- developing an output voltage signal representative of said DC output voltage; and
- regulating said DC output voltage based on said output voltage signal.

12. The method as recited in claim 8 wherein said modulating said first power switch and said modulating said second power switch are performed by first and second pulse-width modulated drive signals, respectively.

13. The method as recited in claim 8 further comprising steering a drive signal to an appropriate one of said first and second power switches.

14. The method as recited in claim 8 wherein said power factor corrector employs topologies selected from the group consisting of:
- boost topologies;
- topologies having capacitive coupling between said input and said output;
- SEPIC topologies;
- flyback topologies; and
- Zeta topologies.

15. A non-isolated power factor corrector adapted to provide a DC output voltage at an output thereof, comprising:
- first and second power switches coupled to an input of said power factor corrector and adapted to receive unrectified AC power;
- a rectifier, coupled to said first and second power switches, that rectifies a waveform from said first and second power switches to develop said DC output voltage; and
- a controller, including:
  - a sensor, coupled proximate said input, that senses a polarity of said unrectified AC power; and
  - a drive circuit, coupled to said sensor, that:
    - closes said first power switch and modulates said second power switch to regulate said DC output voltage when said polarity is negative, and
    - closes said second power switch and modulates said first power switch to continue to regulate said DC output voltage when said polarity is positive.

16. The power factor corrector as recited in claim 15 wherein said sensor is a voltage sensor.

17. The power factor corrector as recited in claim 15 wherein said controller further comprises an input current sensor that develops an input current signal representative of an input current to said power factor corrector, said controller correcting a power factor of said AC power based on said input current signal.

18. The power factor corrector as recited in claim 15 wherein said controller further comprises an output voltage sensor that develops an output voltage signal representative of said DC output voltage, said controller regulating said DC output voltage based on said output voltage signal.

19. The power factor corrector as recited in claim 15 wherein said drive circuit provides pulse-width modulated drive signals to drive said first and second power switches.

20. The power factor corrector as recited in claim 15 wherein said controller further comprises a steering circuit that steers a drive signal to an appropriate one of said first and second power switches based on said polarity.

21. The power factor corrector as recited in claim 15 further comprising topologies selected from the group consisting of:
- boost topologies;
- topologies having capacitive coupling between said input and said output;
- SEPIC topologies;
- flyback topologies; and
- Zeta topologies.

* * * * *